(12) United States Patent
Jennings et al.

(10) Patent No.: US 10,397,289 B2
(45) Date of Patent: Aug. 27, 2019

(54) HTTP LIVE STREAMING (HLS) VIDEO CLIENT SYNCHRONIZATION

(71) Applicant: ARRIS Enterprises LLC, Suwanee, GA (US)

(72) Inventors: William W. Jennings, Duluth, GA (US); Paul A. Clancy, Duluth, GA (US)

(73) Assignee: ARRIS Enterprises LLC, Suwanee, GA (US)

(*) Notice: Subject to any disclaimer, the term of this patent is extended or adjusted under 35 U.S.C. 154(b) by 324 days.

(21) Appl. No.: 15/176,827

(22) Filed: Jun. 8, 2016

(65) Prior Publication Data

US 2016/0366198 A1 Dec. 15, 2016

Related U.S. Application Data (60) Provisional application No. 62/172,939, filed on Jun. 9, 2015.

(51) Int. Cl.
*G06F 15/16* (2006.01)
*H04L 29/06* (2006.01)
(Continued)

(52) U.S. Cl.
CPC ...... *H04L 65/4076* (2013.01); *H04L 12/2854* (2013.01); *H04L 65/1026* (2013.01); *H04L 65/1069* (2013.01); *H04L 67/02* (2013.01); *H04N 21/234* (2013.01); *H04N 21/242* (2013.01); *H04N 21/26258* (2013.01); (Continued)

(58) Field of Classification Search
CPC ............. H04L 65/4076; H04L 12/2854; H04L 65/1026; H04L 65/1069; H04L 67/02; H04N 21/234; H04N 21/242; H04N 21/26258; H04N 21/4302; H04N 21/436; (Continued)

(56) References Cited

U.S. PATENT DOCUMENTS

2009/0161682 A1 6/2009 Johnson
2010/0169459 A1* 7/2010 Biderman .......... H04N 7/17318
  709/219
(Continued)

FOREIGN PATENT DOCUMENTS

EP 2538629 A1 12/2012
EP 2704449 A1 3/2014

OTHER PUBLICATIONS

PCT Search Report & Written Opinion, Re: Application No. PCT/US2016/036521, dated Aug. 29, 2016.
(Continued)

*Primary Examiner* — Dustin Nguyen
*Assistant Examiner* — Hao H Nguyen
(74) *Attorney, Agent, or Firm* — Thomas A. Ward (57) ABSTRACT

A streaming media server is provided that receives a request over a network from a customer premises gateway to receive a streaming media content item that is to be presented on two or more client devices in a synchronized manner. Responsive to the request, the streaming media server sends a manifest associated with the requested streaming media content item to the customer premises gateway only when it has been incrementally updated to remove an oldest media segment URL from the manifest and add a most recent media segment URL to the manifest.

16 Claims, 5 Drawing Sheets

(51) Int. Cl.
  *H04L 29/08* (2006.01)
  *H04L 12/28* (2006.01)
  *H04N 21/242* (2011.01)
  *H04N 21/43* (2011.01)
  *H04N 21/234* (2011.01)
  *H04N 21/44* (2011.01)
  *H04N 21/262* (2011.01)
  *H04N 21/436* (2011.01)
  *H04N 21/845* (2011.01)

(52) U.S. Cl.
  CPC ....... *H04N 21/4302* (2013.01); *H04N 21/436* (2013.01); *H04N 21/44* (2013.01); *H04N 21/8456* (2013.01)

(58) Field of Classification Search
  CPC . H04N 21/44; H04N 21/8456; H04N 21/8586
  USPC .... 709/218, 219, 224, 231, 236; 725/78, 93, 725/95, 109, 110, 114; 370/312, 503, 370/509
  See application file for complete search history.

(56) References Cited

U.S. PATENT DOCUMENTS

| 2010/0246469 | A1* | 9/2010 | Gheorghiu | H04L 1/0002 370/312 |
|---|---|---|---|---|
| 2011/0066746 | A1* | 3/2011 | Bennett | H04N 21/26616 709/231 |
| 2013/0103807 | A1 | 4/2013 | Couto | |
| 2013/0145409 | A1 | 6/2013 | Vince | |
| 2013/0251329 | A1* | 9/2013 | McCoy | H04N 21/654 386/201 |
| 2013/0305303 | A1* | 11/2013 | Yamagishi | H04N 21/631 725/109 |
| 2014/0050082 | A1 | 2/2014 | Sun | |
| 2014/0195651 | A1 | 7/2014 | Stockhammer et al. | |
| 2014/0204962 | A1* | 7/2014 | Park | H04L 65/607 370/509 |
| 2014/0280784 | A1 | 9/2014 | Moroney | |
| 2014/0282771 | A1 | 9/2014 | Tumuluru | |
| 2014/0344893 | A1 | 11/2014 | Moroney | |
| 2014/0359681 | A1* | 12/2014 | Amidei | H04N 21/8547 725/93 |
| 2015/0120953 | A1* | 4/2015 | Crowe | H04L 65/60 709/231 |
| 2015/0334335 | A1* | 11/2015 | White | H04N 21/4126 348/734 |
| 2017/0149548 | A1* | 5/2017 | Mouhouche | H04L 5/0057 |
| 2017/0238027 | A1* | 8/2017 | Amidei | H04L 65/607 709/219 |
| 2017/0257195 | A1* | 9/2017 | Maaref | H04L 1/189 |

OTHER PUBLICATIONS

B. Long, "[FDH] HTTP long polling for low latency segment and MPD updates", 112 MPEG Meeting (Motion Picture Expert Group or ISO/IEC JTC1/SC29/WG11), May 28, 2015.

Editor1, "HTTP-based Streaming and Download Services—Use cases, requirments and working assumptions: Permanent Document", 3GPP draft, vol. SA, WG4, Jan. 12, 2011.

* cited by examiner

HTTP LIVE STREAMING (HLS) VIDEO CLIENT SYNCHRONIZATION

STATEMENT OF RELATED APPLICATION

This application claims the benefit of U.S. Provisional Application No. 62/172,939, as filed on Jun. 9, 2015, the contents of which are incorporated herein by reference.

BACKGROUND

Streaming of media over a network from a content server to a media or client device has become a widely adopted technique for media consumption. A content server may implement the streaming of media by first dividing a media program into segments or chunks which may vary in duration but are often about two-ten seconds in length. The content server publishes a playlist or manifest file that is accessible to the client device. The manifest file includes a list of URLs ("Universal Resource Locators") to media segments that make up the program.

The hypertext transfer protocol ("HTTP") based live streaming ("HLS") protocol, used with TCP IP, allows a content server to publish variant manifest files to client devices. A variant manifest file identifies multiple sets of video streams for a media program, such as a movie, a television program, etc., where each set of video streams has unique encoding parameters (e.g., bit rates, resolutions, etc.) for the media program. The client devices may dynamically switch between the sets of video streams identified in the variant manifest file as the sets of video streams are transmitted from the content server to the client devices. The client devices may choose to receive an initial set of video streams identified in the variant manifest file based on initial network conditions, initial buffer conditions, etc. For example, the client devices may choose to receive a set of high definition ("HD") video streams identified in the variant manifest file if the initial network conditions, the initial buffer conditions, etc., support the streaming of the HD set of video streams. If the initial network conditions degrade, or if the initial buffer conditions degrade, etc., then the client devices may choose to receive a set of low definition video streams identified in the variant manifest file. That is, the client device may dynamically choose different sets of video streams to receive from the content server, where the different sets of video streams have different encoding parameters.

The variant manifest files are dynamically updated by the server and thus the client devices need to periodically retrieve the files. If the manifest files contain the URLs for all the media segments in a program, the size of the files may be excessively large, which can consume a substantial amount of bandwidth and place a burden on the resources of the content server and the media player as the manifest files are periodically communicated between them. One way to reduce the size of the manifest files, which is generally used for live programs, is to only include a limited number of media segments URLs which define a window specifying a small portion of the program. The window is a moving or sliding window that includes a limited number of media segments URLs in which URLs for media segments occurring earlier in time are removed as URL for media segments occurring later in time are added.

SUMMARY

In accordance with one aspect of the invention, two or more media streams that use an IP based segmented video approach such as adaptive bit rate streaming are delivered through a common customer premises gateway so that they can be presented in a synchronized manner on two or more client devices located in the customer premises. In one example, a streaming media server receives a request over a network from a customer premises gateway to receive a streaming media content item (e.g., a live program) that is to be presented on two or more client devices in a synchronized manner. Responsive to the request, the streaming media server sends a manifest associated with the requested streaming media content item to the customer premises gateway only when it has been incrementally updated to remove an oldest media segment URL from the manifest and add a most recent media segment URL to the manifest.

In one particular implementation, the customer premises gateway ensures that the client devices receive the manifest immediately after it has just been updated by repeatedly requesting an updated manifest at time intervals that are greater than the rate at which the manifest is updated. Alternatively, the streaming media server may be provided with a script such as a PHP script that runs whenever synchronization is enabled at the gateway. When a synchronization enabled command is sent by the gateway to the server, the script causes the streaming media server to check its files for an update to the manifest and to send it to the gateway as soon as it is updated.

DETAILED DESCRIPTION

It is sometimes desirable to have two or more televisions or other video rendering devices located in the same premises and presenting the same programs. This may be the case in a bar or restaurant, for instance. The program that is being presented is sometimes a live event such as a sporting event that is being streamed to the televisions. However, synchronizing two or more media streams that use an IP based segmented video approach such as adaptive bit rate streaming (discussed below) so that they are played by the televisions at the same time can be problematic. This problem can appear to be acute even if the two streams are only out of synch by a few seconds. For instance, if the content being streamed is a football game, one television may show a touchdown several seconds before another television in the same location and thus one portion of the premises will see the touchdown before another portion of the premises. As detailed below, the techniques of the present disclosure may be used to synchronize the presentation of the two or more media streams under such circumstances.

Figure 1:
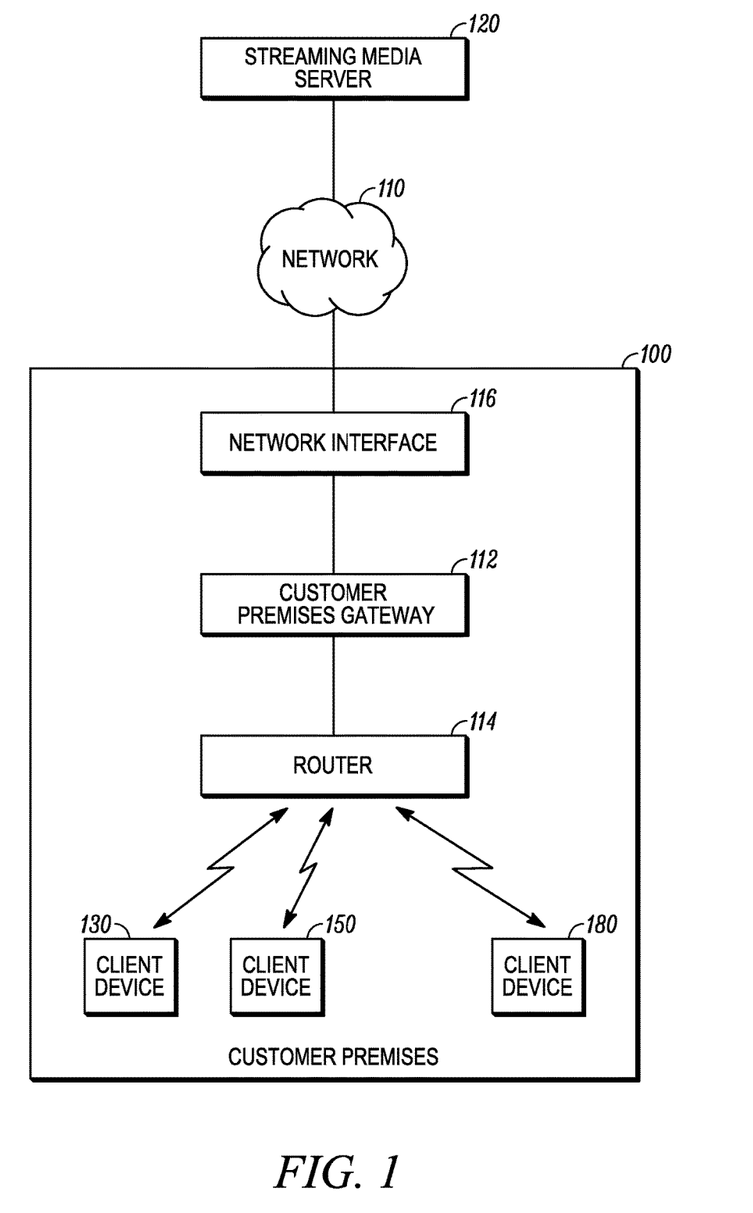
FIG. 1 is a block diagram of one example of an operating environment in which a streaming media server streams content to a customer premises gateway over a network.

Turning to the drawings, wherein like reference numerals refer to like elements, techniques of the present disclosure are illustrated as being implemented in a suitable environment such as shown in FIG. 1. The following description is based on embodiments of the claims and should not be taken as limiting the claims with regard to alternative embodiments that are not explicitly described herein.

As used herein, "streaming media" are media received by and presented to an end-user while being delivered by a streaming provider using Adaptive Bit Rate ("ABR") streaming methods. ABR streaming is a technology that works by breaking the overall media stream or media file into a sequence of small HTTP-based file downloads, each download loading one short segment of an overall potentially unbounded transport stream or media elementary streams. As the stream is played, the client device (e.g., the media player) may select from a number of different alternate streams containing the same material encoded at a variety of data rates, allowing the streaming session to adapt to the available data rate. At the start of the streaming session, the player downloads a manifest containing the metadata for the various sub-streams which are available. Since its requests use only standard HTTP transactions, ABR streaming is capable of traversing a firewall or proxy server that lets through standard HTTP traffic, unlike UDP-based protocols such as Real-Time Transport Protocol. This also allows a content delivery network to readily be implemented for any given stream.

HTTP Live Streaming (HLS) is one example of an ABR streaming method. HLS is an HTTP-based communications protocol suitable for media streaming of live content and is described in Internet Drafts to the Internet Engineering Task Force such as HTTP Live Streaming draft-pantos-http-live-streaming-10, Oct. 15, 2012 and all subsequent drafts.

An increasing number of video playback devices prefer video content to be delivered via ABR streaming rather than streamed continuously. The playback device, using the HTTP Live Streaming format, receives the manifest as an m3u8 file that contains links, media uniform resource identifiers (URLs), to each of the segments of video content, and processes the manifest file to retrieve and play back each media segment in turn. In this disclosure, "HLS" represents the range of protocols that segment media content and employ a playlist or manifest file to manage playback.

FIG. 1 illustrates one example of an operating environment in which aspects of the techniques described herein may be implemented. In this example a streaming media server 120 delivers streaming media content to multiple customer premises such as customer premises 100, which may be, for example, a residence or business. In general any number of customer premises may be supported utilizing the techniques and mechanisms described herein. Further, multiple servers may provide content and/or may operate together to provide content according to the techniques and mechanisms described herein. For example, one server may create the content, create the manifests and create the multiple media segments and other servers may store and transmit the created content.

Network 110 may be any type of network whether wired, wireless or any combination thereof. For example, network 100 may be a wide area network (WAN) such as the Internet or an intranet. As another example, network 110 may be a cellular network (e.g., 3G, CDMA). In yet another example, network 110 may be a content delivery system such as a broadcast television network, cable data network (e.g. an all-coaxial or a hybrid-fiber/coax (HFC) network), an xDSL (e.g., ADSL, ADLS2, ADSL2+, VDSL, and VDSL2) system, or a satellite television network. In yet other examples the network 110 may be a combination of two or more different types of networks.

A network interface 116 is located at the customer premises 100. The network interface 116 is used to establish communication over the network 110. Network interface 116 may be a variety of different types of network interfaces depending on the type of network 110 that is employed. For instance, network interface 116 may be a fiber optic network interface, a cable modem or other type of network interface. A customer premises gateway 112 is communicatively coupled to the network interface 116 by, for example, an Ethernet cable. In some cases the functionality of the network interface 116 and the customer premises gateway 112 may be included in a single device. The customer premises gateway 112 converts the data received from the network interface 116 to a format suitable for distribution to client devices by a router. For instance, the customer premises gateway 112 may convert the data from a link layer protocol such as cable/DOCSIS or DSL to Ethernet.

A router 114 is in turn communicatively coupled to the customer premises gateway 112. The router 114 is capable of wired and/or wireless communication with two or more client devices such as client devices 130, 150 and 180 over a local area network (LAN). That is, the router 114 provides network access to the client devices. The communication link between the router 114 and the client devices 130, 150 and 180 may employ one or more protocols such as Ethernet, Wi-Fi (i.e., IEEE 802.11), Multimedia over Coax (MoCA) and power-line communication technologies. In some embodiments the functionality of the gateway 112 and the router 114, or even the gateway 112, router 114 and network interface 116, may be included in a single device.

Client devices 130, 150 and 180 may be any type of electronic devices that are capable of receiving data transmitted over a network and generating output utilizing the data received via the network. For example, client devices 150 and 180 may be televisions, set top boxes, wireless mobile devices, smartphones, tablets, PDAs, entertainment devices such as video game consoles, consumer electronic devices, PCs, etc. The output may be any media type or combination of media types, including, for example, audio and video.

Figure 2:
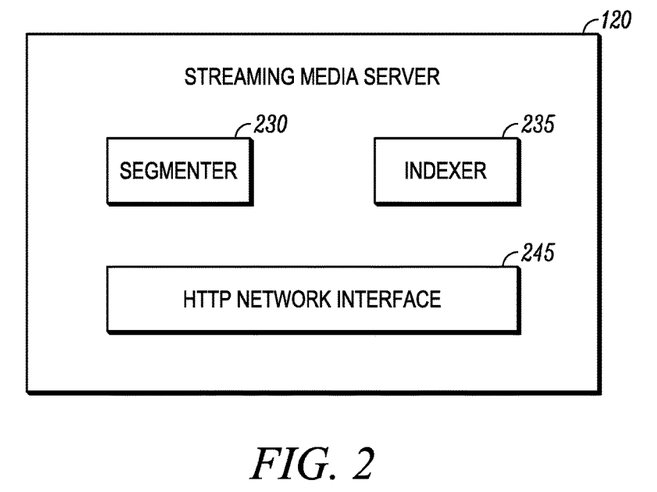
FIG. 2 is a block diagram showing one example of a streaming media server.

Streaming media server 120 may operate as a HTTP server in any manner known in the art. That is, server 120 includes a HTTP network interface 245 that provides content using HTTP protocols. While the example presented herein is described in terms of HTTP, other transfer protocols can be utilized in a similar manner. As shown in FIG. 2, segmenter 230 and indexer 235 are components that reside on server 120 (or multiple servers) to provide content in media segments with a manifest file as described herein. These media segments and manifest files may be provided over the network 110 in FIG. 1 via HTTP network interface 145 (or via other servers) using HTTP protocols. Components as discussed herein can be implemented as hardware, software, firmware or a combination thereof.

Segmenter 230 of server 120 may function to divide the stream of media data into multiple media files or segments that may be transmitted via HTTP protocols. Indexer 235 may function to create a manifest file corresponding to the segmented media files so that client devices can reassemble the media segments to provide real-time, or near real-time, transmission of the content provided by server 120. In response to one or more requests from a client device, HTTP network interface 245 (or other servers) may transmit one or more manifest files as generated by indexer 235 and media segments of content as generated by segmenter 230. Server 120 may also include additional components not illustrated in FIG. 2.

Figure 3:
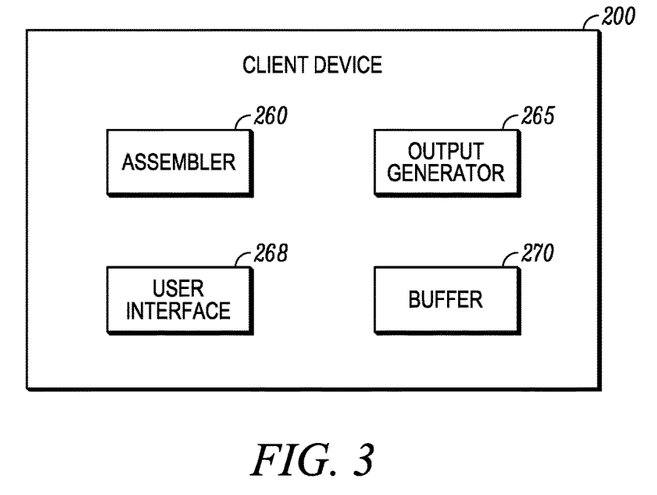
FIG. 3 is a block diagram showing one example of a client device that can present streaming media content received from a streaming media server.

FIG. 3 shows one example of a client device 200 such as the client devices 130, 150 and 180 shown in FIG. 1. Client device 200 may receive the manifest files and media segments from server 120 over network 110 via customer premises gateway 112. Client device 200 can include assembler component 260, output generator component 265 and user interface 268, which in some cases may all be components of a media player. Assembler component 260 receives the manifest files from server 120 and use the manifest files to access and download media segments from server 120. Output generator component 265 uses the downloaded media segments to generate output from the client device 200. User interface 268 allows the user to select, play and otherwise control media content, including streaming media content. The output may be provided by one or more speakers, one or more display screens, a combination of speakers and display screens or any other input or output device. The client device can also include memory (e.g. flash memory or DRAM, etc.) to act as a buffer 270 to store the media segments (e.g. compressed media files or decompressed media files) as they are received; the buffer 270 can provide many seconds worth of presentable content beyond the time of content currently being presented so that the buffered content can later be displayed while new content is being downloaded. This buffer 270 can provide presentable content while the client device is attempting to retrieve content through an intermittently slow network connection and hence the buffer can hide network latency or connection problems. Client device 200 may also include additional components not illustrated in FIG. 3.

A client device, e.g., client device 130, 150, 180 or 200, initiates communication with the server 120 by sending a request to the server 120 for playback of media content. The server 120 then generates or fetches a manifest file to send to the client device in response to the request. Example formats for the manifest file include the m3u and m3u8 formats. An m3u8 file is a specific variation of an m3u encoded using UTF-8 Unicode characters. The m3u file format was initially used in the WINAMP Media Player for audio-only files but has since become a de facto manifest standard on many client devices for local or streaming media, including music and other media types. Many client devices employ variations of the m3u file format, any of which can be used according to the present disclosure. A manifest file can include links to media segments as relative or absolute paths to a location on a local file system or as a network address, such as a URL path. The m3u8 format is used herein as a non-limiting example to illustrate the principles of manifest files including non-standard variants.

The manifest file includes a list of Uniform Resource Locators ("URLs") to different representations of the requested segmented media content. Before or at the time of the request, the server 120 generates or identifies the media segments of the requested media content as streaming media content. The media segments of the streaming media content are generated, either by the server 120, by the content producer, or by some other entity, by splitting, transcoding, or transrating the original media content. Upon receiving the manifest file, the client device can fetch a first media segment for playback from the streaming media content then, during playback of that media segment, fetch a next media segment for playback after the first media segment, and so on until the end of the media content is reached. Table 1 presents the contents of one example of an m3u8 manifest file for a 16 second portion of a live video program. The manifest file includes URLs for 4 media segments denoted segment1.ts to segment4.ts

TABLE 1

EXTM3U
EXT-X-TARGETDURATION:4
EXT-X-VERSION:3
EXT-X-MEDIA-SEQUENCE:49
EXTINF:4,
Segment1.ts
EXTINF:4,
Segment2.ts
EXTINF:4,
Segment3.ts
EXTINF:4,
Segment4.ts The illustrative manifest file shown in Table 1 is an extended M3U manifest that employs tags that effectively extend the M3U format. The tags can be used by the server to organize, transmit and process the media segments that represent the original media content. The client devices use this information to reassemble and present the media segments. For instance, the EXT-X-MEDIA-SEQUENCE tag can indicate the sequence number of the first URL that appears in a manifest file. Likewise, the EXT-X-TARGET-DURATION tag can indicate the maximum media segment duration.

The server 120 can create a manifest file by appending URLs to the end of the manifest file and removing URLs from the beginning of the manifest file on a rolling basis, thereby providing a sliding window of media content accessible to a client device. Such a rolling manifest is generally always used for live content and may sometimes be used for other programming as well, particularly for programs long in duration. The client device then repeatedly downloads updated copies of the manifest file to continue viewing. The client device can continue to repeatedly request the manifest in the rolling mode until it finds an end tag in the manifest.

Referring again to FIG. 1, in some cases two or more client devices in the same customer premises such as client devices 130, 150 and 180 in FIG. 1 may be presenting the same live streaming media content. However, the two streams presented on the two client devices may not be synchronized with one another and may be out of synch by as much as the duration of a single media segment, which is typically in the range of 2 to 10 seconds. In some cases this degree of asynchronism can be problematic, particularly if, as previously mentioned, the two client devices are located in the same room, which is sometimes the case in a commercial establishment such as a restaurant or bar.

The asynchronicity between client devices arises because the first client device may happen to request the manifest immediately before it is updated when a new segment is added and the oldest segment is removed. Upon receiving the manifest the first client device will select one of the segments to begin playing. Generally a client device will select neither the most recent segment in the manifest nor the oldest, but a segment whose entry in the manifest is located somewhere therebetween. For instance, in the manifest shown in Table 1, the first client device may select the third oldest segment, which in this case is segment 3. A second client device may select the same streaming media content as the first client. However, the second client may happen to request the manifest immediately after it has been updated. Table 2 shows the manifest in Table 1 after it has been updated by removing the oldest segment (segment 1) and adding a new segment (segment 5). The second client also selects the third oldest segment from the manifest. However, in this case the third oldest segment is segment 4, not segment 3. Thus, while the first client device will begin playing the same streaming media content at segment 3, the second client device will begin playing the streaming media content at segment 4. The two client devices will thus by out of synch by the duration of a single segment.

TABLE 2

EXTM3U
EXT-X-TARGETDURATION:4
EXT-X-VERSION:3
EXT-X-MEDIA-SEQUENCE:50
EXTINF:4,
Segment2.ts
EXTINF:4,
Segment3.ts
EXTINF:4,
Segment4.ts
EXTINF:4,
segment5.ts To overcome the aforementioned problem in which two or more client devices receiving the same streaming media content from a common gateway are not synchronized with one another, the gateway can delay delivery of a manifest to each of the client devices until that manifest has just been updated. That is, the gateway can ensure that the manifest is sent to the client devices immediately after it has been updated (taking into account, of course, inherent delays due to such things as processing time, transmission delays and the like). The gateway will also pace out delivery of the segments so that they take the same amount of time to reach the different client devices, even if the links between the client devices and the gateway operate at different download transmission rates, such as may occur, for example, when one client device has a wired connection and another client device has a wireless connection.

Figure 4:
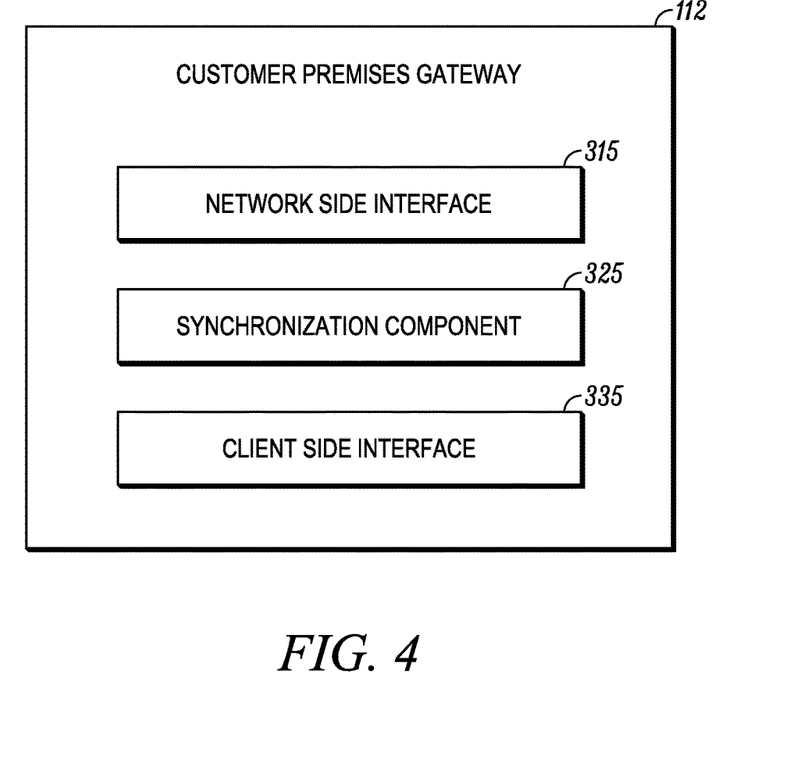
FIG. 4 is a block diagram showing one example of a customer premises gateway that may be used to synchronize a streaming media content item so that it can be presented by two client devices in a synchronized manner.

FIG. 4 shows one example of the customer premises gateway 112 shown in FIG. 1 which is configured to cause streaming media content to be delivered to two or more client devices so that the content is played on all the client devices in synchronization with one another. In this example the functionality of the router 114 shown in FIG. 1 is also incorporated into the gateway 112. The gateway 112 includes a network-side interface 315 for establishing communication with the router 114, a client-side interface 335 for establishing communication with the client devices 130, 150, 180 and a synchronization component 325 for synchronizing the media streams delivered to the different client devices in accordance with the techniques described herein. As previously mentioned, the gateway 112 may be incorporated into router 114 or the router 114 and network interface 116. The functionality of the synchronization component 325 will be described with reference to FIG. 5.

Figure 5:
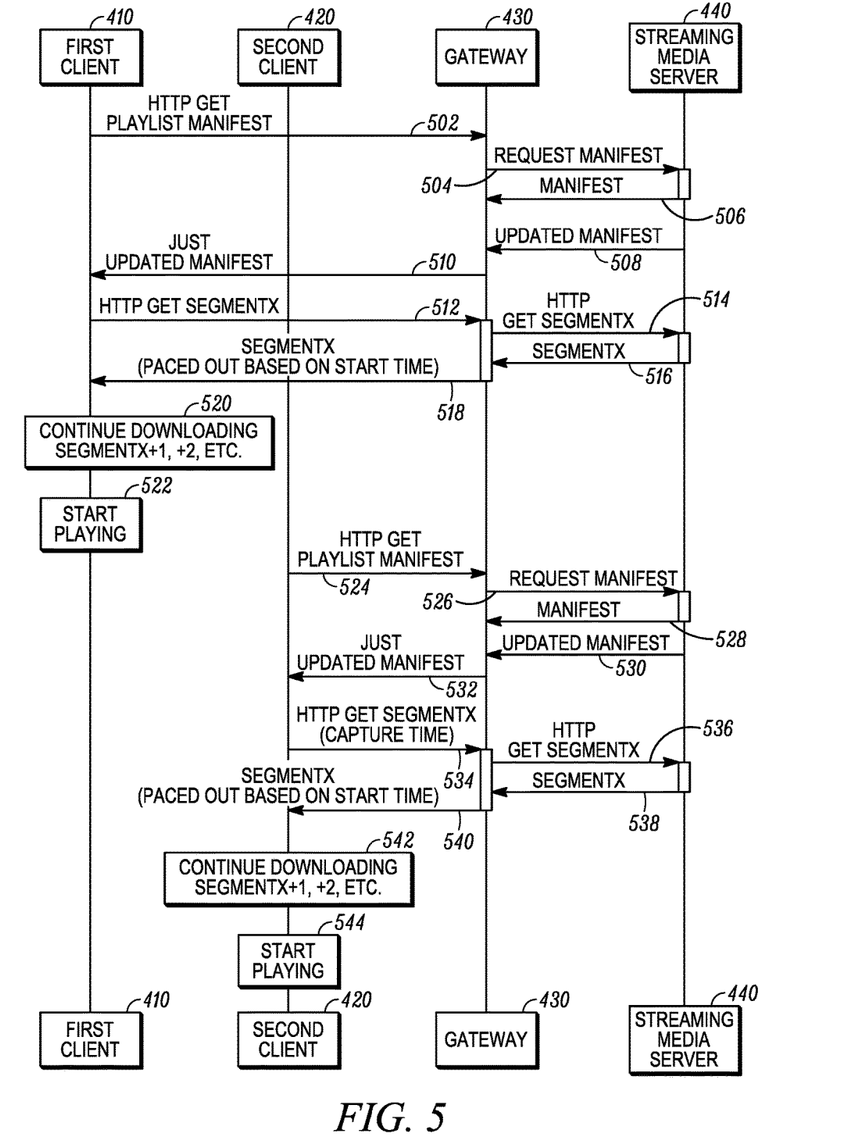
FIG. 5 is a message flow diagram between two client devices and a server via a gateway for illustrating hypertext transfer protocol ("HTTP") when the media content is to be presented by two client devices in a synchronized manner.

FIG. 5 is a message flow diagram illustrating one example of HLS streaming media between two client devices 410 and 420 and a streaming media server 440 in which the presentation of a streaming media content item by both client devices is synchronized. The client devices 410 and 420 are located in the same customer premises and communicate with the server 440 via customer premises gateway 430 such as the customer premises gateway 112 shown in FIGS. 1 and 4. As previously discussed, each client device may include a media player for requesting, receiving and playing streaming media content. In one embodiment the first and second client devices 410 and 420 are assumed to be of the same type (e.g., model) and configured similarly so that, for instance, the first segment they select from the manifest is located at the same point in the sequence of segments and, also, so that they have the same buffer size in order to begin playing the streaming media content item after the same number of segments have been acquired. That is, the first and second client devices are assumed to process streaming media in the same manner.

In a series of preliminary steps that are omitted for clarity, a user or users of the client devices may navigate through program listings and select a streaming media content item (e.g., a video program) for viewing. For purposes of illustration it will be assumed that both client devices 410 and 420 will select the same live streaming media content item and that the first client 410 will select it and begin presenting it before the second client 420. The video program is linked to a URL pointing to a high-level manifest that includes information about variant manifest files with video streams having different encoding parameters. The media players in the client devices examine the high-level manifest and either start by requesting the lowest (or highest) bandwidth manifest file or they optionally perform some bandwidth availability estimation and selects the corresponding bandwidth manifest file.

Turning now to FIG. 5, in step 502 the first client device 410 requests a 2nd level or playlist manifest file for the corresponding bandwidth it desires. The gateway 430 receives the request and examines the URL that is requested. In one embodiment, the synchronization component 325 in the gateway 430 may include a set of IP address filters to intercept those requests from the client devices that are addressed to the streaming media server 440. If the request is an HTTP Get request with a destination network address that corresponds to the streaming media server, then in step 504 the gateway 430 will request the manifest, which will be sent by the server 440 in step 506. The gateway 430 will note the manifest sequence number of the manifest it received and will continue to request updated manifests at time intervals that are greater than the rate at which the manifest is updated (i.e., greater than the duration of a media segment). For instance, if the media segments are say, six seconds in length, the gateway may request updated manifest every 0.25 seconds. At step 508 the gateway 430 receives a manifest with a sequence number that has been incremented by one from the manifest previously received in step 506, indicating that the manifest has just been updated. The gateway 430 then immediately sends this updated manifest to the first client device 410 in step 510. In this way the gateway 430 ensures that the first client device 410 receives a manifest immediately after it has been updated.

Upon receiving the manifest the first client device 410 selects one of the segments. As previously mentioned, a client device will select neither the most recent segment in the manifest nor the oldest, but a segment whose entry in the manifest is located somewhere therebetween (e.g., 3 or 4 segments deep in the manifest). The segment entry that is selected (denoted segmentx is FIG. 5) is predetermined and will be the same for both the first and second client devices 410 and 420 since they both process streaming media in the same manner. The first client device 410 then sends an HTTP Get request to the streaming media server 440 in step 512 to receive the selected segment. The gateway 430 once again intercepts the request based on its URL and passes it to the server 440 in step 514. The server 440 provides the gateway 430 with the selected segment in step 516.

Client devices 410 and 420 may have different connection speeds to the gateway 430. For instance, first client device 410 may have a wireless connection and second client device 420 may be a wired connection, yielding, for instance, as much as an order of magnitude difference in connection speeds between them. As a consequence, if the gateway 430 were to transmit a segment to both client devices 410 and 420 simultaneously, the client device with the faster connection speed (second client device 420 in this example) will receive the segment in less time than the client device with the slower connection speed (first client device 410 in this example) and hence will begin decoding it first, assuming they were sent to the client devices as the same time. To ensure that the transmission time required to receive a given segment is the same for both client devices so that they will begin decoding it at the same time, the gateway 430 will transmit the segments at a transmission rate that is slower than the slowest of the two connection speeds, but faster than the real-time rate at which the segments will be played. Thus, at step 518 the gateway 430 sends segment x to the first client device 410, pacing it out a predetermined rate.

As indicated at step 520, the first client device 410 will continue to request subsequent segments x+1, x+2, etc, which will be stored in its buffer. The first client device 410 will begin playing the streaming media at step 522 either after a certain number of segments have been stored in its buffer or after a certain total duration of video has been stored in its buffer.

It should be noted that after the client device begins playing out the streaming media content from its buffer, it will no longer be necessary for the gateway 430 to pace out the segments at the predetermined rate since the client device itself will control the pacing, which will be determined by the real-time video play speed. That is, at this time the gateway 430 may begin sending subsequent segments to the first client device 410 at whatever rate is allowed by the link between the gateway and client device.

Next, beginning at step 524, the sequence of steps performed for the first client device 410 will be repeated for the second client device 420. In step 524 the second client device 420 requests the 2nd level or playlist manifest file for the corresponding bandwidth it desires. The gateway 430 receives the request and the IP address filters intercepts those requests that are addressed to the streaming media server 440. If the request is an HTTP Get request with a destination network address that corresponds to the streaming media server, then in step 526 the gateway 430 will request the manifest, which will be sent by the server 440 in step 528. The gateway 430 will note the manifest sequence number of the manifest it received and, as before, will continue to request updated manifests at time intervals that are greater than the rate at which the manifest is updated (i.e., greater than the duration of a media segment). At step 530 the gateway 430 receives a manifest with a sequence number that has been incremented by one from the manifest previously received in step 506, indicating that the manifest has just been updated. The gateway 430 then immediately sends this updated manifest to the second client device 420 in step 532. In this way the gateway 430 ensures that the second client device 420 receives a manifest immediately after it has been updated.

Upon receiving the manifest the second client device 420 selects one of the segments. Since the first and second client devices 410 and 420 process streaming media in the same manner, they will both select the same entry in the manifest (e.g., 3 or 4 segments deep in the manifest). The second client device 420 then sends an HTTP Get request to the streaming media server 440 in step 534 to receive the selected segment. The gateway 430 once again intercepts the request based on its URL and passes it to the server 440 in step 536. The server 440 provides the gateway 430 with the selected segment in step 538.

At step 540 the gateway 430 sends segment x to the second client device 420, pacing it out a predetermined rate to ensure that the transmission time required to receive a given segment is the same for both the first and second client devices. In this way the first and second client devices 410 and 420 will begin decoding at the same time. As indicated at step 542, the second client device 420 will continue to request subsequent segments x+1, x+2, etc, which will be stored in its buffer. The second client device 420 will begin playing the streaming media at step 544 either after a certain number of segments have been stored in its buffer or after a certain total duration of video has been stored in its buffer.

As discussed above in connection with the first client device 410, once the second client device begins playing out the streaming media content from its buffer, it will no longer be necessary for the gateway 430 to pace out the segments at the predetermined rate since the client device itself will control the pacing, which will be determined by the real-time video play speed. That is, at this time the gateway 430 may begin sending subsequent segments to the second client device 420 at whatever rate is allowed by the link between the gateway and client device. In this way first and second client devices 410 and 420 both continue to play out the segments of the streaming media content in synch with one another.

In the example presented above in connection with FIG. 5 the gateway ensures that the client devices receive the manifest immediately after it has just been updated by repeatedly requesting an updated manifest at time intervals that are greater than the rate at which the manifest is updated (see, for instance, steps 506 and 508). In one alternative embodiment, however, the streaming media server may be provided with a script such as a PHP script that runs whenever synchronization is enabled at the gateway. When a synchronization enabled command is sent by the gateway to the server, the script causes the streaming media server to check its files for an update to the manifest and to send it to the gateway as soon as it is updated. In this way the gateway does not need to send multiple requests to receive the updated version of the manifest. For instance, the gateway can make a request to the server using a modified URL (e.g., a static URL followed by the query parameters of the stream) such as: http:www.server.com/synch.php?stream=LIVE/ABC/4308/index.m3u8. The server will then wait for the manifest to be updated before sending the response.

Aspects of the subject matter described herein are operational with numerous general purpose or special purpose computing system environments or configurations. Examples of well-known computing systems, environments, or configurations that may be suitable for use with aspects of the subject matter described herein comprise personal computers, server computers, hand-held or laptop devices, multiprocessor systems, microcontroller-based systems, set-top boxes, programmable consumer electronics, network PCs, minicomputers, mainframe computers, personal digital assistants (PDAs), gaming devices, printers, appliances including set-top, media center, or other appliances, automobile-embedded or attached computing devices, other mobile devices, distributed computing environments that include any of the above systems or devices, and the like.

Aspects of the subject matter described herein may be described in the general context of computer-executable instructions, such as program modules or components, being executed by a computer. Generally, program modules or components include routines, programs, objects, data structures, and so forth, which perform particular tasks or implement particular abstract data types. Aspects of the subject matter described herein may also be practiced in distributed computing environments where tasks are performed by remote processing devices that are linked through a communications network. In a distributed computing environment, program modules may be located in both local and remote computer storage media including memory storage devices.

Figure 6:
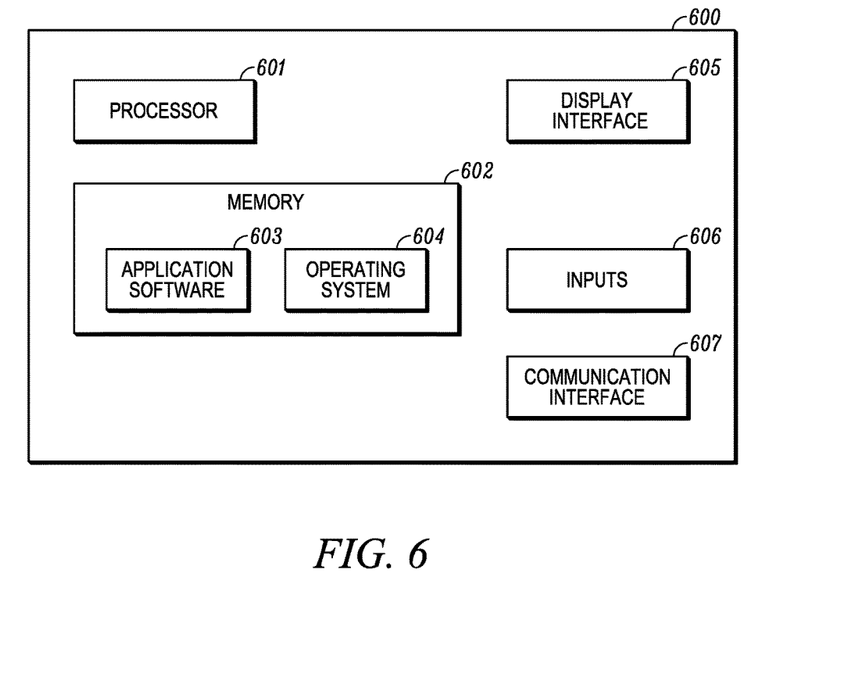
FIG. 6 is a block diagram of various components of an illustrative computing-based device in which the server and/or client device shown in the various figures may be implemented.

FIG. 6 illustrates various components of an illustrative computing-based device 600.which may be implemented as any form of a computing and/or electronic device, and in which embodiments of a server, gateway and/or a client as described above may be implemented.

The computing-based device 600 comprises one or more inputs 606 which are of any suitable type for receiving media content, Internet Protocol (IP) input, activity tags, activity state information, resources or other input. The device also comprises communication interface 607 to enable the device to communicate with one or more other entity using any suitable communications medium.

Computing-based device 600 also comprises one or more processors 601 which may be microprocessors, controllers or any other suitable type of processors for processing computing executable instructions to control the operation of the device in order to provide a search augmentation system. Platform software comprising an operating system 604 or any other suitable platform software may be provided at the computing-based device to enable application software 603 to be executed on the device.

The computer executable instructions may be provided using any computer-readable media, such as memory 602. The memory is of any suitable type such as random access memory (RAM), a disk storage device of any type such as a magnetic or optical storage device, a hard disk drive, or a CD, DVD or other disc drive. Flash memory, EPROM or EEPROM may also be used.

An output is also provided such as an audio and/or video output to a display system integral with or in communication with the computing-based device. A display interface 605 is provided to control a display device to be used in conjunction with the computing device. The display system may provide a graphical user interface, or other user interface of any suitable type.

As disclosed herein, the term "memory" or "memory unit" may represent one or more devices for storing data, including read-only memory (ROM), random access memory (RAM), magnetic RAM, core memory, magnetic disk storage mediums, optical storage mediums, flash memory devices, or other computer-readable storage media for storing information. The term "computer-readable storage medium" includes, but is not limited to, portable or fixed storage devices, optical storage devices, wireless channels, a SIM card, other smart cards, and various other mediums capable of storing, containing, or carrying instructions or data. However, computer readable storage media do not include transitory forms of storage such as propagating signals, for example.

Furthermore, embodiments may be implemented by hardware, software, firmware, middleware, microcode, hardware description languages, or any combination thereof. When implemented in software, firmware, middleware, or microcode, the program code or code segments to perform the necessary tasks may be stored in a computer-readable storage medium and executed by one or more processors.

Although the subject matter has been described in language specific to structural features and/or methodological acts, it is to be understood that the subject matter defined in the appended claims is not necessarily limited to the specific features or acts described above. Rather, the specific features and acts described.

The invention claimed is:

1. A method for delivering streaming media content from a streaming media server to at least two client devices through a common gateway so that the streaming media content is presented simultaneously by the client devices, comprising:
   (i) determining that a request received by the common gateway from a first client device is a request to receive from a streaming media server the streaming media content that is to be synchronized with a presentation of the streaming media content by a second client device that receives the streaming media content through the common gateway, the first and second client devices being of a common type that process streaming media in a common manner, wherein the streaming media content is live content streamed in accordance with HTTP Live Streaming (HLS);
   (ii) sending the request from the gateway to the streaming media server;
   (iii) responsive to the request from the gateway, receiving at the gateway an initial manifest associated with the streaming media content, the initial manifest including a sequence of media segment URLs indicating an ordering of the media segments that create a representation of a portion of the streaming media content;
   (iv) sending one or more additional requests from the gateway to the streaming media server to receive an updated version of the initial manifest, the one or more additional requests being sent at time intervals that are less than a duration of the media segments in the initial manifest;
   (v) forwarding the updated version of the initial manifest and not the initial manifest itself to the first client device immediately upon receiving the updated version of the initial manifest at the gateway, wherein delivery of the updated version of the initial manifest is delayed with a given delay to enable forwarding of the updated version of the initial manifest immediately;
   (vi) receiving a request from the first client device to receive a selected media segment specified in the updated version of the initial manifest;
   (vii) forwarding the request for the selected media segment to the server and receiving the selected media segment in response;
   (viii) forwarding the selected media content to the first client device at a transmission rate greater than a rate at which the media segment plays out in real-time and less than a transmission rate available over a slower of a first or second transmission link, the first transmission link being between the gateway and the first client device and the second transmission link being between the gateway and the second client device, the transmission rate selected to create the given delay to enable synchronization of the media content to the first client device and the second client device; and
   (ix) repeating steps (i)-(viii) for the second client device.

2. The method of claim 1, wherein the request to receive the media content is received by the gateway at a time subsequent to a time at which the request to receive the media content is received by the gateway from the first client device.

3. The method of claim 1, wherein the selected media segment is a media segment sequentially located between a more recent and an oldest media segment included in the updated version of the initial manifest, the first and second client devices both selecting a media segment that has a common sequential location in the updated version of the initial manifest.

4. The method of claim 1, wherein the transmission rate at which the selected media content is forwarded to the first client device over the first link is a transmission rate at which the selected media content is able to be transmitted to the second client device over the second link.

5. The method of claim 1, further comprising forwarding subsequent media segments from the gateway to the first client device at a maximum transmission rate available over the first link.

6. The method of claim 1, wherein the gateway is a router.

7. The method of claim 1, wherein the gateway is a combined modem/router.

8. The method of claim 1, wherein determining that the request to receive synchronized streaming media content includes examining a destination network address of the request and intercepting requests having a network address associated with the streaming media server.

9. A customer premises gateway, comprising:
a network-side interface for communicating over a wide-area network (WAN);
a client-side interface establishing communication between the WAN and a plurality of client devices that process streaming media in a common manner;
one or more processors:
one or more computer-readable storage media containing instructions which, when executed by the one or more processors perform a method for delivering streaming media content received over the WAN to the plurality of client devices wherein the streaming media content is live content streamed in accordance with HTTP Live Streaming (HLS), the method including:
receiving first and second requests from first and second client devices, respectively, to receive a common live streaming media content item that is to be synchronized on first and second client devices;
responding to the each of the first and second requests by ensuring that manifests associated with the common live streaming media content item are forwarded to the first and second client devices immediately after the manifests have been incrementally updated to include a URL for a new media segment, wherein delivery of updated versions of the manifests is delayed with a given delay to enable forwarding of the updated versions of the manifests immediately;
responsive to requests from the first and second client devices to receive selected media segments specified in the updated versions of the manifests, sending the selected media segments to the first and second client devices at a transmission rate greater than a rate at which the media segments play out in real-time and less than a transmission rate available over a slower of a first or second transmission link, the first transmission link being between the client-side interface and the first client device and the second transmission link being between the client-side interface and the second client device, the transmission rate selected to create the given delay to enable synchronization of the media content to the first client device and the second client device.

10. The customer premises gateway of claim 9, wherein ensuring that the manifests are forwarded to the first and second client devices immediately after the manifests have been incrementally updated includes periodically polling a streaming media server over the WAN for updated versions of the manifests at time intervals that are shorter than a duration of the media segments.

11. The customer premises gateway of claim 10, wherein ensuring that the manifests are forwarded to the first and second client devices immediately after the manifests have been incrementally updated includes causing a script residing on a streaming media server that provides the manifests to send the manifests to the gateway as soon as they are updated.

12. The customer premises gateway of claim 9, wherein the second request from the second client device is received subsequent to a time at which the first request is received from the first client device.

13. The customer premises gateway of claim 12, wherein responding to the first and second requests includes forwarding different updated versions of the manifests to the first and second client devices.

14. The customer premises gateway of claim 9, further comprising forwarding subsequent media segments from the gateway to the first client device at a maximum transmission rate available over the first link.

15. The customer premises gateway of claim 9, further comprising determining that the first and second requests to receive the common live streaming media content item by examining destination network addresses of the first and second requests and intercepting requests having a network address associated with streaming media server.

16. The customer premises gateway of claim 9, further comprising receiving the manifests and the selected media segments from a streaming media server over the wide-area network.

* * * * *